United States Patent [19]
Griffey

[11] 3,733,519
[45] May 15, 1973

[54] PROTECTION CIRCUIT FOR REGULATED POWER SUPPLIES

[75] Inventor: Donald E. Griffey, Skokie, Ill.

[73] Assignee: Motorola, Inc., Franklin Park, Ill.

[22] Filed: Apr. 24, 1972

[21] Appl. No.: 246,978

[52] U.S. Cl...............317/31, 307/234, 317/33 VR, 321/2, 321/11, 323/DIG. 1
[51] Int. Cl..............................................H02h 3/20
[58] Field of Search.....................323/DIG. 1; 321/2, 321/11, 14; 307/234, 237; 317/33 VR, 31

[56] References Cited

UNITED STATES PATENTS

| | | | |
|---|---|---|---|
| 3,670,234 | 6/1972 | Joyce | 317/33 VR |
| 3,527,997 | 9/1970 | Nercessian | 317/33 VR |

*Primary Examiner*—James D. Trammell
*Attorney*—Vincent J. Rauner et al.

[57] ABSTRACT

A protection circuit for regulated switching power supplies of the type employing a feedback circuit for adjusting the switching duty cycle to regulate the output thereof. A diode clamping circuit is provided within the feedback loop to prevent the error voltage developed by the feedback circuit from exceeding a predetermined level, thereby maintaining the switching duty cycle of the supply within a safe operating range during turn-on, turn-off, overload and other transient conditions.

11 Claims, 2 Drawing Figures

PATENTED MAY 15 1973  3,733,519

PROTECTION CIRCUIT FOR REGULATED POWER SUPPLIES

BACKGROUND

1. Field of the Invention

This invention relates generally to burn-out protection systems for power supplies, and more particularly to systems that restrict the operating conditions of the supply to maintain the components therein operating in a mode that does not cause premature failure thereof.

There are many applications wherein it is desired to protect the components of a power supply from possible damage caused by transient conditions that can cause overloading of the power supply components. One such application is in a television receiver that utilizes a switching mode power supply to power the cathode ray tube (either directly or indirectly) and other circuits in the receiver. In such a receiver, the switching mode power supply must provide several regulated output voltages to the receiver circuitry, thereby requiring voltage stabilization circuitry to be employed within the switching mode power supply. Because of the finite amount of time required for the output voltages of the supply to reach a steady state condition, a large error voltage is developed within the feedback loop during receiver turn-on, turn-off and during certain transient conditions. The large error voltage developed under these conditions causes the switching duty cycle of the power supply to become highly unsymmetrical, a condition which can lead to excessive power dissipation by the power devices of the supply, thereby causing premature failure of the devices.

2. Prior Art

Several techniques for providing protection from overdissipation in solid state power supplies are known. In one such system, higher dissipation devices than are necessary for steady state operating conditions are employed to provide reserve dissipation capacity to handle the higher dissipation caused by the transient conditions. Another such system employs thermal sensing circuitry connected to the power devices of the supply to sense the heat generated by excessive power dissipation and to turn off the supply before damage to the device can occur.

Whereas these techniques provide a way to protect power supply components from the effects of overdissipation, the first technique requires the use of higher capacity devices than are normally necessary, thereby increasing the cost, size and complexity of the power supply. The second technique requires the use of costly and complex thermal sensing circuitry, and does not provide effective protection for the devices because damage can occur before the thermal sensors have responded to the overdissipation. Furthermore, the second technique requires that the power supply be reset, either automatically or manually, following each shutdown caused by a thermal overload.

SUMMARY

It is an object of the present invention to provide an improved circuit for protecting the components of a power supply from excessive power dissipation.

It is another object of the invention to prevent damage to the components of a regulated power supply during operating transients.

It is a further object of this invention to provide a switching mode power supply that maintains its components operating within a safe operating range under all operating conditions.

In accordance with a preferred embodiment of the invention, an error voltage limiting circuit is employed in conjunction with a switching mode power supply of the type employing a switching signal oscillator and a feedback circuit for adjusting the pulse width of the switching signal to maintain the output voltage of the power supply substantially constant. The error voltage limiter is coupled to the feedback circuit and to a reference voltage to maintain the error voltage within a predetermined range determined by the reference voltage, thereby maintaining the pulse width of the switching signal within a range that does not cause damage due to excessive power dissipation in the high power components of the supply.

DETAILED DESCRIPTION

Figure 1:
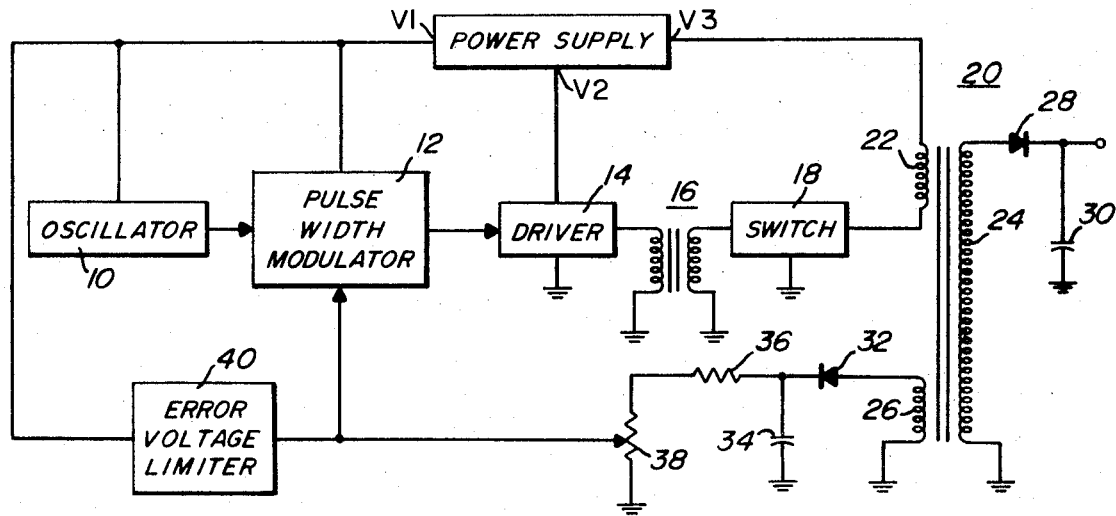
Figure 2:
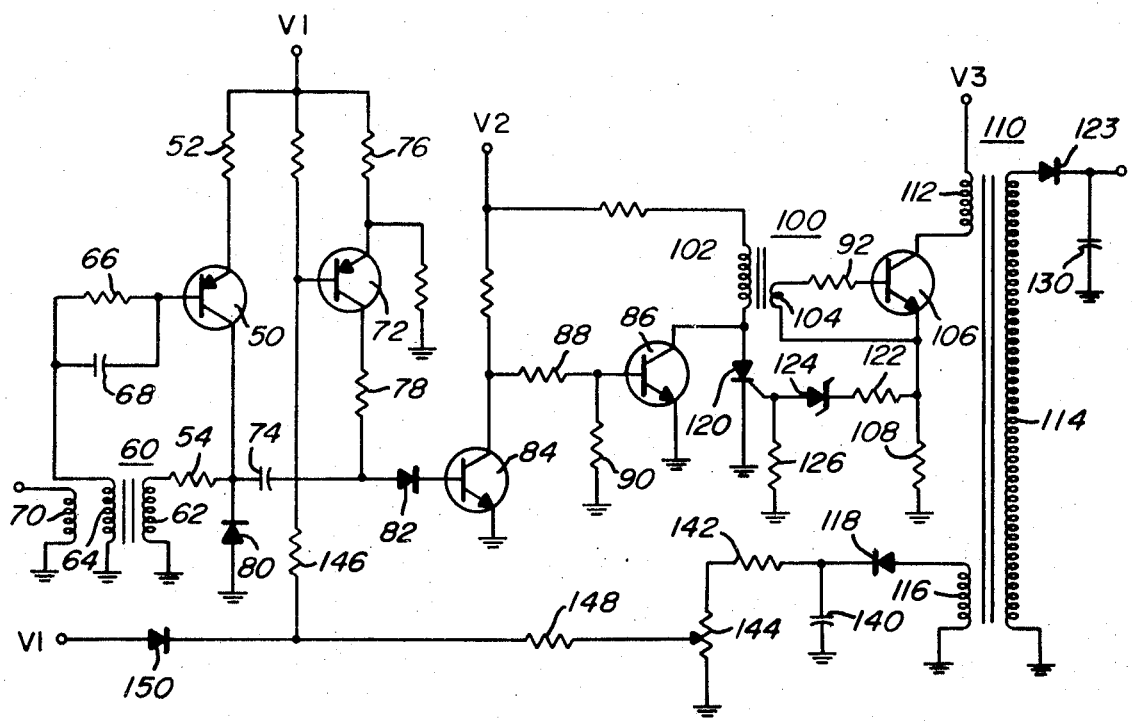

FIG. 1 is a combined block and schematic diagram showing a switching mode power supply employing the protection system according to the invention; and FIG. 2 is a detailed schematic diagram of a switching mode power supply, useable in a television receiver, employing one embodiment of the protection circuit according to the invention.

DETAILED DESCRIPTION

Referring to FIG. 1, an oscillator 10 is connected to a power supply V1 and to a driver 14 through a pulse width modulator 12, also connected to power supply V1. The driver 14 is connected to a power supply V2, which generally has a higher voltage than power supply V1, and to a switch 18 through a coupling transformer 16. Switch 18 is connected to a primary winding 22 of a transformer 20, also having secondary windings 24 and 26. The secondary winding 24 is connected to an output circuit comprising a diode 28 and a capacitor 30, while secondary winding 26 is connected to a feedback circuit comprising a diode 32, a capacitor 34, a resistor 36 and a potentiometer 38. The wiper arm of the potentiometer 38 is connected to the pulse width modulator 12 for controlling the width of the output pulses therefrom. An error voltage limiter 40, according to the invention, is interposed between a reference voltage, in this embodiment power supply V1, and a point within the feedback loop, in this embodiment the wiper arm of potentiometer 38.

In operation, the oscillator 10 provides output pulses to pulse width modulator 12. The oscillator 10 may be free running, or may be synchronized to an external source of oscillations. Pulse width modulator 12 provides output pulses to driver 14 in response to the pulses received from oscillator 10, the pulse width of the pulses from modulator 12 being controlled by the amplitude of an error voltage received from potentiometer 38. The driver 14 amplifies the pulses received from modulator 12 and applies them to switch 18 through the coupling transformer 16. Switch 18 serves to interrupt the current flowing from a power supply V3 through primary winding 22 and switch 18 to ground in response to the pulses received from driver 14. The alternating current components of the interrupted current flowing through primary winding 22 are transformed by transformer 20 to provide an alternating current voltage across secondaries 24 and 26. The alternating current voltage appearing across the secondary winding 24 is rectified by the diode 28 and filtered by capacitor 30 to provide a filtered direct current output voltage for utilization by other electronic circuitry, such as, for example, a television receiver. The voltage appearing across the secondary winding 26 as a result of the current flowing through the primary winding 22 is proportional to the voltage appearing across the secondary winding 24. The voltage across secondary winding 26 is rectified by the diode 32 and filtered by the capacitor 34 to provide a direct current voltage at the junction of diode 32 and capacitor 34 that is proportional to the amplitude of the output voltage provided by the supply. Resistor 36 and potentiometer 38 serve as a voltage divider network for applying a voltage proportional to the voltage appearing across capacitor 34 to the pulse width modulator 12. The pulse width modulator 12 adjusts the width of the output pulses applied to driver 14 in accordance with the error voltage applied thereto from potentiometer 38 to keep the output voltage of the supply, which appears across capacitor 30, substantially constant. The output voltage appearing across capacitor 30 can be adjusted over a limited range by adjusting potentiometer 38.

Under certain operating conditions, such as, for example, initial turn-on of the power supply and other conditions which will be discussed further on in this application, the voltage appearing across potentiometer 38 will be relatively low, indicating that the output voltage of the supply is low. The low voltage applied to pulse width modulator 12 causes the output pulses thereof to become highly unsymmetrical, a condition which can damage certain components of the power supply, particularly switch 18. The reasons for the damage to these components will be explained in a subsequent section of this application. To protect the aforementioned components, the error voltage limiter 40 is employed to prevent the duty cycle of the signal from modulator 12 from becoming highly unsymmetrical. This is achieved by preventing the voltage applied to modulator 12 from deviating from a predetermined range of voltages determined by the voltage V1.

It should be noted that although a separate oscillator and pulse width modulator have been shown, a variable pulse width oscillator or other variable pulse width means may be used and still fall within the scope of the invention. Similarly, although a transformer type power supply having utilization means comprising a separate driver and switching stage is shown for purposes of illustration in this embodiment, the error voltage limiter, according to the invention, may be utilized with any switching power supply using other coupling and output means wherein it is necessary to maintain the duty cycle of the switching signal within a predetermined range.

Referring to FIG. 2, which shows a more detailed circuit diagram of the power supply of FIG. 1, an oscillator transistor 50 has its emitter connected to the power supply V1 through a resistor 52. The collector of transistor 50 is connected through a resistor 54 to a primary winding 62 of a feedback transformer 60. A secondary winding 64 of transformer 60 is connected to the base of transistor 50 through a parallel circuit including a resistor 66 and a capacitor 68 to complete a feedback path between the collector and base of transistor 50 for causing transistor 50 to oscillate. Another winding 70 is provided within transformer 60 for receipt of a synchronizing signal from an external signal source for synchronizing the oscillations produced by transistor 50 to an external source of oscillations.

A variable current source transistor 72 is coupled between power supply V1 and one plate of a capacitor 74 by means of resistors 76 and 78. The other plate of capacitor 74 is connected to the collector of transistor 50 and to the cathode of a diode 80 which has its anode connected to ground. A diode 82 is employed to connect the junction of capacitor 74 and resistor 78 to the base of an amplifier transistor 84. The collector of amplifier transistor 84 is coupled to the base of a driver transistor 86 by means of a voltage divider network including resistors 88 and 90. The collector of transistor 86 is connected to a primary winding 102 of a coupling transformer 100.

A secondary winding 104 of transformer 100 is connected between the base and emitter of a switching transistor 106 through a resistor 92. Switching transistor 106 is connected to a primary winding 112 of an output transformer 110 to provide a current path from a power supply V3 through primary winding 112, transistor 106 and a current sensing resistor 108 to a ground, or common potential. The current sensing resistor 108 is also connected to the gate of a silicon controlled rectifier 120 through a resistor 122 and zener diode 124. The anode of silicon controlled rectifier 120 is connected to the collector of amplifier transistor 86, and the cathode of silicon controlled rectifier 120 is connected to ground. The gate of silicon controlled rectifier 120 is also connected to ground through a resistor 126.

An output winding 114 of output transformer 110 is connected to a rectifier/filter combination comprising a diode 123 and a capacitor 130. A voltage sensing secondary winding 116 is connected by means of another rectifier/filter combination including a diode 118 and a capacitor 140 to a voltage divider network comprising a resistor 142 and a potentiometer 144. The wiper arm of potentiometer 144 is connected to the base of the variable current source transistor 72 through resistors 146 and 148. A diode 150 is interposed between a reference voltage, in this embodiment power supply V1, and the junction of resistors 146 and 148 to limit the range of voltages which can occur at the junction of the last mentioned resistors.

In operation, the oscillator transistor 50 alternates between its conductive and nonconductive state of the oscillatory rate, in this embodiment, at a television line frequency of approximately 15,738 Hz. Transistor 50 remains conductive for only a short time duration during each cycle, in this embodiment, approximately 5 microseconds. During the 5 microsecond interval that transistor 50 is conductive, the capacitor 74 is charged in a first direction from the power supply V1 through resistor 52, transistor 50, diode 82 and the base to emitter junction of transistor 84. During this time, the plate of capacitor 74 that is connected to the collector of transistor 50 is charged positive with respect to the plate connected to diode 82. After transistor 50 becomes nonconductive, the plate of capacitor 74 that is connected to the collector of transistor 50 is returned to a ground, or common, potential through resistor 54 and the secondary winding 62 of transformer 60. Since the plate of capacitor 74 that is connected to diode 82 has been charged negative with respect to the plate connected to the collector of transistor 50, a negative voltage will be applied to diode 82 when transistor 50 is nonconductive, thereby rendering transistor 84 nonconductive.

Transistor 84 will remain nonconductive until capacitor 74 can be charged in a second opposite direction to provide a positive voltage to diode 82 sufficient to forward bias the base to emitter junction of transistor 84. The capacitor 74 is charged in the second direction from the power supply V1 by means of the current source transistor 72 and resistors 76 and 78. The time required for capacitor 74 to charge to a sufficiently positive voltage to turn on transistor 84 is determined by the conductivity of transistor 72. When the conductivity of transistor 72 is high, capacitor 74 will charge rapidly and transistor 84 will be quickly rendered conductive. Conversely, when the conductivity of transistor 72 is low, the charging rate of capacitor 74 will be slow, and transistor 84 will remain nonconductive for a time duration approaching the time interval between pulses from oscillator transistor 50.

As transistor 84 is alternately rendered conductive and nonconductive by the voltage on capacitor 74, the voltage appearing at the collector of transistor 84 will render transistor 86 alternately conductive and nonconductive, with transistor 86 being rendered conductive when transistor 84 is nonconductive and vice versa. During the time that transistor 86 is conductive, current flows through the primary winding 102 of transformer 100. The aforementioned current flow induces a signal in the secondary winding 104 having a polarity that maintains the switching transistor 106 nonconductive. When transistor 86 is rendered nonconductive, the energy that was stored in primary winding 102 during the time interval that transistor 86 was conductive induces a voltage in secondary 104 having the proper polarity for rendering transistor 106 conductive.

As transistor 106 is alternately rendered conductive and nonconductive by the action of transistor 86, the current flow through secondary winding 112 is periodically interrupted at a rate determined by the frequency of oscillation of oscillator 50. The interrupted current flowing through primary winding 112 induces a voltage in secondary winding 114 which is rectified and filtered by diode 123 and capacitor 130, respectively, for application to an external load (not shown). Since it is desirable to maintain the output voltage across capacitor 130 relatively constant regardless of the load employed, the voltage sensing secondary winding 116 and associated circuitry are employed in a feedback loop to adjust the length of time that transistor 106 is conductive during each cycle in accordance with the requirements of the external load. The secondary winding 116 is tightly coupled to the output secondary winding 114 to cause the voltage appearing across winding 116 to be proportional to the voltage across winding 114. The voltage across winding 116 is rectified and filtered by diode 118 and capacitor 140, respectively, to provide an error voltage across capacitor 140 proportional to the output voltage across capacitor 130. The voltage across capacitor 140 is coupled to the base of transistor 72 through resistors 142, 146 and 148 and potentiometer 144.

The feedback network provides a voltage to the base of transistor 72 proportional to the output voltage of the supply. When the output voltage of the supply drops, the voltage applied to the base of transistor 72 also drops, thereby causing the transistor to become more conductive. As transistor 72 becomes more conductive, capacitor 74 is charged more rapidly after each conductive period of transistor 50, thereby causing transistor 84 to become conductive earlier in the cycle. Causing transistor 84 to become conductive earlier in the cycle increases its relative on time, or duty cycle. An increase in duty cycle of transistor 84 decreases the duty cycle of transistor 86, which in turn increases the duty cycle of transistor 106, thereby increasing the power delivered to transformer 110 to maintain the output voltage of the supply at the desired level when the load on the supply is increased.

When a supply of the aforementioned type is employed to drive a circuit requiring a relatively large amount of power, such as, for example, a television receiver, the feedback circuit can cause overdissipation to occur in the higher power stages, especially transistor 106, during power supply turn-on and other transient conditions. During turn-on, for example, power is applied to the circuit at points V1, V2 and V3 to energize the supply. However, due to the finite time required to charge capacitors 130 and 140, the voltage applied to the base of transistor 72 is initially quite low, thereby causing capacitor 74 to charge rapidly to increase the duty cycle of transistors 84 and 106 for increasing the power supplied to transformer 110. Since transistor 86 is cut off when transistors 84 and 106 are conductive, increasing the duty cycles of transistors 84 and 106 necessarily reduces the duty cycle of transistor 86. If the duty cycle of transistor 86 becomes excessively low, such as, for example, approximately 10 percent on and 90 percent off, the energy stored in transformer 100 during the relatively short conductive interval of transistor 86 will be insufficient to maintain transistor 106 fully on during the off time of transistor 86.

In order for transistor 106 to handle the high current required by a high power load without overdissipation, its switching action must be rapid, and the transistor must be either fully on or fully off. When there is insufficient energy stored in transformer 100 during the time that transistor 86 is conductive, transistor 106 will not remain fully on during the time that transistor 86 is nonconductive, but will pass through a stage of partial conductivity as the stored energy in transformer 100 decays. During the time that transistor 106 is partially conductive, a large amount of power will be dissipated within the transistor due to the combination of the high voltage appearing between the collector and the emitter and the heavy current flowing therethrough.

A similar situation can occur during turn-off of the supply after the supply has been operated into an overload. The supply includes overload protection circuitry comprising silicon controlled rectifier 120, zener diode 124 and resistors 122 and 126. When an overload occurs, a high voltage resulting from the high current flowing through transistor 106 appears across resistor 108 and causes silicon controlled rectifier 120 to become conductive, thereby bringing the collector of transistor 86 to ground potential to remove the drive signal applied to coupling transformer 100. When the power supply is manually turned off following the overload, the power supply voltages V1, V2 and V3 decay at a finite rate. As the voltages decay, the current through the silicon controlled rectifier 120 gradually decreases until the current through the silicon controlled rectifier drops below its holding current, thereby causing silicon controlled rectifier 120 to become nonconductive. This allows the power supply to become operative with reduced values of V1, V2 and V3, which do not provide adequate energy to transformer 100, thereby causing possible burn out of transistor 106 due to overdissipation.

In order to prevent the aforementioned and other transient conditions from causing overdissipation to occur in transistor 106, an error voltage limiting circuit is employed in the feedback circuit to maintain the duty cycle of transistor 86 sufficiently high to assure that adequate energy is stored in transformer 100 to maintain transistor 106 fully conductive during the off time of transistor 86. In this embodiment, the error voltage limiting circuit includes an error voltage limiting diode 150 having an anode connected to the power supply voltage V1 and a cathode connected to the junction of feedback resistors 146 and 148. Diode 150 serves to limit the negative excursion allowable at the junction of resistors 146 and 148, thereby limiting the maximum current flowing through transistor 72 to maintain the duty cycle of transistor 86 at a level sufficient to provide adequate drive to transistor 106.

In operation, upon turn on of the power supply, the voltage V1, which is a regulated and filtered voltage for energizing the switching mode power supply in this embodiment, begins to rise to approach the regulated level. The voltage V1 causes diode 150 to become conductive and to apply a voltage that is one diode drop lower than the voltage V1 to the junction of resistors 146 and 148, to cause the voltage applied to the voltage regulating circuit to initially increase in accordance with the voltage V1 during the time before the error voltage has had a chance to increase, thereby maintaining the voltage applied to the base of transistor 72 in a range that prevents overdissipation in transistor 106. As the power supply becomes operative, the voltage appearing across potentiometer 144 increases, thereby increasing the voltage applied to resistor 148. When the error voltage becomes sufficiently high to cause the voltage appearing at the junction of resistors 146 and 148 to exceed the voltage V1, the diode 150 is reverse biased thereby preventing the voltage V1 from being applied to the junction of resistors 146 and 148, and allows the power supply to operate in a normal regulated mode.

When the power supply is turned off, the voltage appearing across potentiometer 144 drops rapidly relative to the drop in the reference voltage V1. The drop in the voltage appearing across potentiometer 144 is reflected in a drop in voltage at the junction of resistors 146 and 148 which causes diode 150 to become forward biased again. When the diode 150 is conductive, the voltage at the junction of resistors 146 and 148 is determined by the voltage V1 which has a decay characteristic that is chosen to be slower than the decay characteristic of the voltage across potentiometer 144, the decay characteristic being chosen to maintain the switching duty cycle within a safe operating range during the time that the power supply is operating at reduced voltages following shut off.

In this embodiment, a single diode 150 is connected between the feedback loop and the power supply voltage V1, which provides a convenient reference potential, for reasons of simplicity and due to the availability of the voltage V1, however, any circuit that limits the feedback voltage in either the positive or negative direction, as required, and which operates from any suitable reference voltage may be used and still fall within the scope of the invention.

I claim:

1. In a voltage regulated switching power supply for operation from a source of direct current voltage having voltage sensing means for developing an error voltage in response to the output voltage of the supply, and pulse width control means for varying the switching duty cycle of the supply in response to the error voltage in a manner tending to maintain said output voltage substantially constant, a protection system comprising; a source of reference potential independent of said output voltage, and clamping means connected to said voltage sensing means and to said reference potential source for clamping said error voltage to said reference potential when the output of said supply is below a predetermined level for maintaining said error voltage within a predetermined voltage range to maintain the duty cycle of the supply within predetermined limits.

2. A system as recited in claim 1 wherein said clamping means includes a diode having first and second terminals, said first terminal being connected to said source of reference potential and said second terminal being connected to said voltage sensing means.

3. A system as recited in claim 2 wherein said source of reference potential is said source of direct current potential.

4. A switching mode power supply for operation from a source of direct current potential comprising; oscillator means for providing a variable pulse width signal, means connected to said oscillator means for utilizing said variable pulse width signal to provide an output voltage in response thereto, voltage sensing means connected to said utilization means for sensing the magnitude of said output voltage to provide an error voltage in accordance therewith, means connecting said voltage sensing means to said oscillator means for varying the pulse width of the signal therefrom in accordance with the magnitude of said error voltage in a manner tending to maintain said output voltage substantially constant, and limiting means connected to said voltage sensing means for maintaining said error voltage at a predetermined amplitude when said output voltage drops below a predetermined level, thereby maintaining the pulse width of said oscillator means within a predetermined range.

5. A power supply as recited in claim 4 wherein said limiting means includes a source of reference potential independent of said output voltage and a diode having first and second terminals, said first terminal being connected to said source of direct current potential and said second terminal being connected to said voltage sensing means.

6. A power supply as recited in claim 5 wherein said utilization means includes a transformer and transistor switch means having input, output and common terminals, and wherein said transformer is connected to said input terminal.

7. A power supply as recited in claim 5 wherein said source of reference potential includes said source of direct current potential.

8. A switching mode power supply including in combination, means for producing variable width pulses, said variable width pulse producing means being responsive to voltages applied thereto for varying the width of the pulses, output circuit means for providing voltage to a load, switching means responsive to said variable width pulse producing means connected to said output circuit means for intermittently applying power thereto in response to said variable width pulses, energy storage means connected to said variable width pulse producing means and said switch means for receiving said variable width pulses and storing the energy contained therein and transferring said energy to said switch means for operation thereof, feedback means connected to said output circuit means and to said variable width pulse producing means for varying the width of said pulses in response to said output voltage in a manner tending to maintain said output voltage substantially constant, and means connected to said variable width pulse producing means for maintaining the width of said pulses within a predetermined range containing sufficient energy for proper operation of said switch means when the voltage provided by said output circuit means is below a predetermined level.

9. A power supply as recited in claim 8 wherein said storage means is an inductive storage means.

10. A power supply as recited in claim 9 wherein said storage means is a transformer.

11. A power supply as recited in claim 8 wherein said means for maintaining the width of said pulses includes a source of reference potential and a diode having first and second terminals, said first terminal being connected to said reference potential source, and said second terminal being connected to said variable pulse width producing means for applying a voltage related to said reference potential to said variable pulse width producing means to control the width of said pulses.

* * * * *